United States Patent
Vogel

(10) Patent No.: US 8,851,966 B2
(45) Date of Patent: Oct. 7, 2014

(54) PREDICTIVE ANALYTICS FOR TARGETED PLAYER ENGAGEMENT IN A GAMING SYSTEM

(71) Applicant: SAP AG, Walldorf (DE)

(72) Inventor: Andreas Vogel, San Francisco, CA (US)

(73) Assignee: SAP AG, Walldorf (DE)

( * ) Notice: Subject to any disclaimer, the term of this patent is extended or adjusted under 35 U.S.C. 154(b) by 24 days.

(21) Appl. No.: 13/659,551

(22) Filed: Oct. 24, 2012

(65) Prior Publication Data

US 2013/0316779 A1 Nov. 28, 2013

Related U.S. Application Data

(60) Provisional application No. 61/651,428, filed on May 24, 2012.

(51) Int. Cl.
*A63F 9/24* (2006.01)
*G07F 17/32* (2006.01)
*G06F 17/40* (2006.01)

(52) U.S. Cl.
CPC ............... *G07F 17/32* (2013.01); *G06F 17/40* (2013.01)
USPC ............................................. 463/16; 463/42

(58) Field of Classification Search
USPC ................... 463/16, 25, 42, 43; 705/14.12
See application file for complete search history.

(56) References Cited

U.S. PATENT DOCUMENTS

| | | |
|---|---|---|
| 7,035,653 B2 * | 4/2006 | Simon et al. .................. 455/466 |
| 2003/0109305 A1 | 6/2003 | Gavin et al. |
| 2005/0143174 A1 | 6/2005 | Goldman et al. |
| 2005/0153767 A1 * | 7/2005 | Gauselmann ................... 463/16 |
| 2007/0082738 A1 | 4/2007 | Fickie et al. |
| 2010/0041475 A1 | 2/2010 | Zalewski et al. |
| 2010/0324908 A1 | 12/2010 | Rosser et al. |
| 2012/0040761 A1 * | 2/2012 | Auterio et al. .................. 463/42 |
| 2012/0122570 A1 | 5/2012 | Barnoff |
| 2012/0238353 A1 * | 9/2012 | Herrmann et al. .............. 463/25 |
| 2013/0005438 A1 * | 1/2013 | Ocko et al. ...................... 463/25 |
| 2013/0005447 A1 * | 1/2013 | Lutnick et al. .................. 463/25 |
| 2013/0029766 A1 * | 1/2013 | Wickett et al. .................. 463/42 |
| 2013/0079120 A1 * | 3/2013 | Walker et al. ................... 463/25 |
| 2013/0095460 A1 | 4/2013 | Bishop |
| 2013/0095927 A1 * | 4/2013 | Rietman ......................... 463/42 |

* cited by examiner

*Primary Examiner* — William Brewster
*Assistant Examiner* — Jason Skaarup
(74) *Attorney, Agent, or Firm* — Fountainhead Law Group PC

(57) ABSTRACT

A gaming system may include an event filter to identify players as targets for engagement. The player may be modeled to predict what they might do under a given situation. One or more engagement actions may be developed based at least on the player's predicted behaviour. The player is then engaged in accordance with the engagement actions. Results from engagements with many players may be assessed and the gaming system may be adjusted according to the assessment.

20 Claims, 4 Drawing Sheets

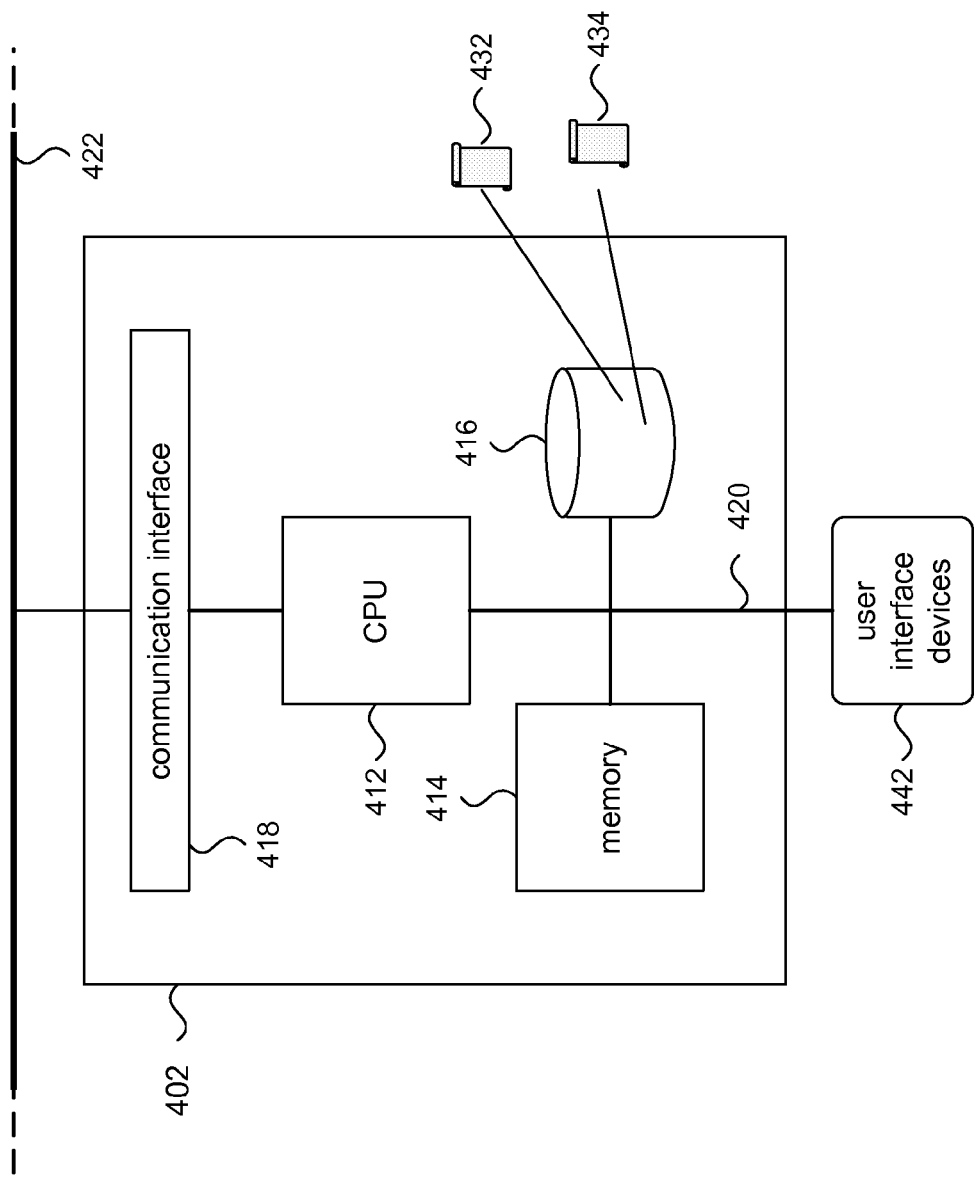

PREDICTIVE ANALYTICS FOR TARGETED PLAYER ENGAGEMENT IN A GAMING SYSTEM

CROSS REFERENCE TO RELATED APPLICATIONS

The present disclosure claims priority to U.S. Provisional App. No. 61/651,428 filed May 24, 2012, the content of which is incorporated herein by reference in its entirety for all purposes. The present disclosure is related to the following commonly owned, concurrently filed applications, the disclosure of each of which is hereby incorporated by reference in its entirety for all purposes:

U.S. Appl. No. 13/659,583, entitled "PLAYER SEGMENTATION BASED ON PREDICTED PLAYER INTERACTION SCORE"

U.S. Appl. No. 13/659,613, entitled "PREDICTIVE ANALYSIS BASED ON PLAYER SEGMENTATION"

U.S. Appl. No. 13/659,517, entitled "ARTIFICIAL INTELLIGENCE AVATAR TO ENGAGE PLAYERS DURING GAME PLAY"

BACKGROUND

Unless otherwise indicated herein, the approaches described in this section are not prior art to the claims in this application and are not admitted to be prior art by inclusion in this section.

Online gaming is becoming a significant business enterprise. The Internet makes gaming accessible to players around the world. However, challenges exist to convert "free" players into "paying" players and to maintain a steady revenue from players. For example, reducing the churn rate (i.e., the number of players who leave the game after playing and never return) increases the likelihood of more paying players. Challenges exist for popularizing a game. Players may be discouraged if a game is too difficult to play. On the other hand, players may quickly loose interest if game play is not sufficiently challenging.

BRIEF DESCRIPTION OF THE DRAWINGS

FIG. 4 illustrates a specific embodiment of the gaming system of FIG. 1.

DETAILED DESCRIPTION

Disclosed embodiments relate to a gaming system that fosters player engagement with the gaming system in order to optimize the player's game play experience in a way that is mutually beneficial to the player and to an enterprise that operates gaming system. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
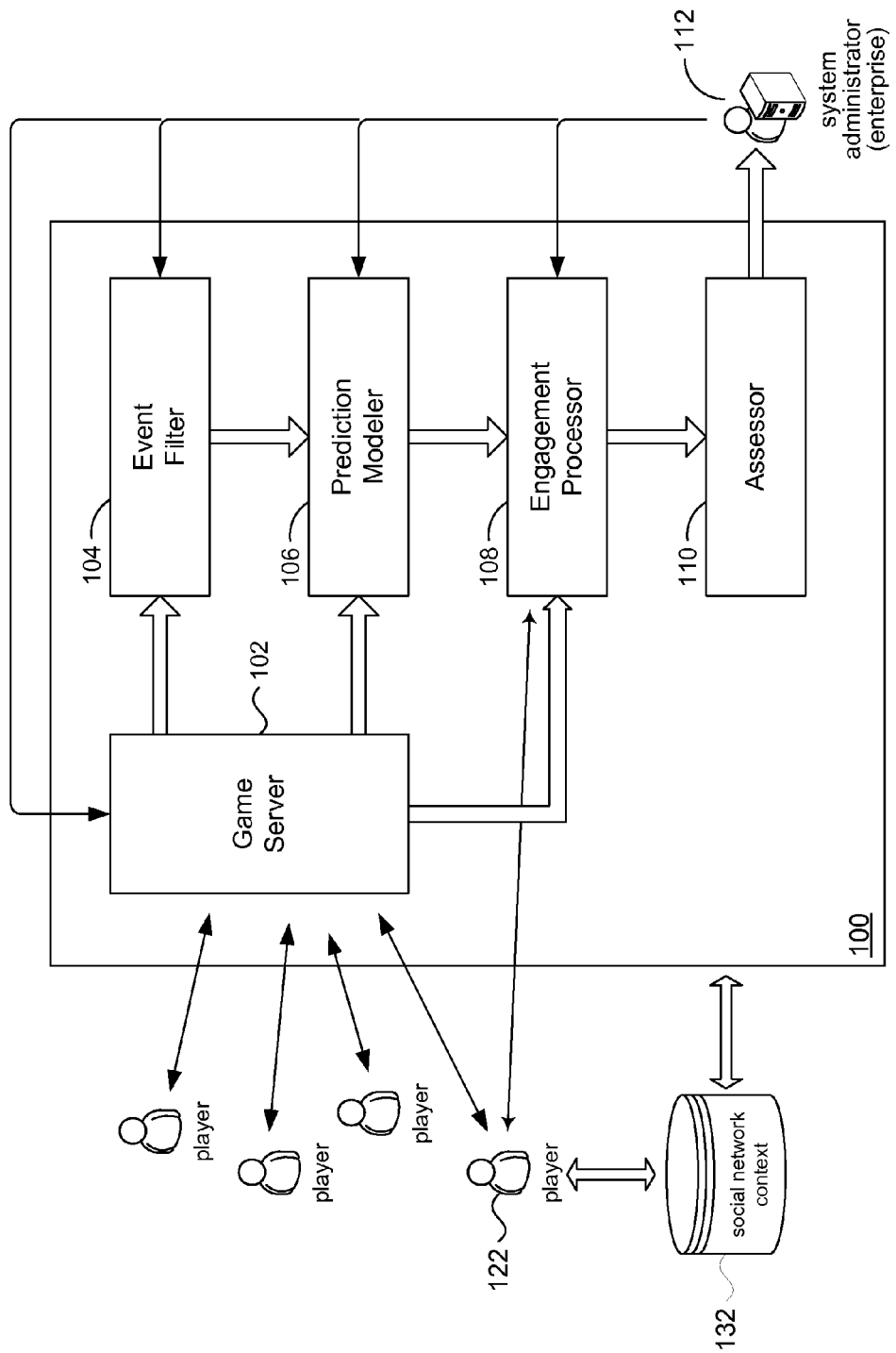
FIG. 1 shows a high-level system diagram of a gaming system according to the present disclosure.

FIG. 1 is a high level block diagram of a gaming system 100 in accordance with principles of the present disclosure. In some embodiments, the gaming system 100 may include a game server 102, an event filter 104, a prediction modeler 106, an engagement processor 108, and an assessor 110. The gaming system 100 may be hosted or otherwise operated by an enterprise ("game publisher", not shown). In some embodiments, the game may be an online game that players log onto in order to enter the game; an example of online gaming systems are known as massively multiplayer online role-playing games (MMORPGs). The gaming system 100 may be free for new users, but may require payment for continued play. Players may purchase game items (e.g., weapons, ammo, transportation, etc.) in order to facilitate their progress in the game, and so on.

The game server 102 may provide a game infrastructure and game mechanics to support game play among players of the game, such as supporting a gaming environment within which players may interact with each other and with elements of the game (e.g., "game elements" such as structures, non-player characters—NPCs, and so on), maintaining and managing state changes in the gaming environment, providing interfaces for players, and so on. Events (game events) may occur during game play. For example, players' actions may cause game events; changes in a player's state may result in a game event (player dies, levels up, and so on), changes in the states of the game elements may cause game events (e.g., a weapon runs out of ammo), and so on.

Game events generated by the game server 102 during game play may be provided to the event filter 104. In accordance with the present disclosure, the event filter 104 may identify a player (e.g., player 122) based on one or more game events that occur during game play. The game event may be as simple as the player logging on to the game, or that the player has been killed, or is trapped somewhere, and so on. The game event that triggers the identification of the player may arise from the occurrence of a series of other game events involving the player or other players, or events involving game elements. In some embodiments, the event filter 104 may identify a group of players. Though the remaining description assumes the event filter 104 has identified one player, the discussion may apply equally to a group of identified players.

The prediction modeler 106 may model player behaviour to assess how likely a player (e.g., player 122) is to exhibit a specific behaviour under a given set of circumstances during game play. The prediction modeler 106 may then output one or more predictions of what the player may do (outcomes). The game server 102 may provide state information and game events generated during game play to the prediction modeler 106 as a basis for making one or more predictions about what the player may do in given their situation in the game.

The predicted outcome(s) of the prediction modeler 106 may then feed into the engagement processor 108. Based on predictions made by the prediction modeler 106 and other factors such as relevant game context and social network context 132, for example, the engagement processor 108 may generate engagement activity to engage the player. For example, the engagement activity may include actions relating to game play, actions involving commercializing aspects of game play (e.g., becoming a paying player, purchase virtual items, etc.), targeted advertising, and so on.

The assessor 110 may be used to facilitate making adjustments in various components in the gaming system 100. In some embodiments, the assessor 110 may collect data from the engagement processor 108, which may be used to assess the effectiveness of the engagement activities produced by the engagement processor. A system administrator 112 may be someone in the enterprise who can make adjustments to one or more components in the gaming system 100 based on information provided by the assessor 110. In some embodiments, the system administrator 112 is a human operator, and in other embodiments the system administrator 112 may include some degree of automation.

Figure 2:
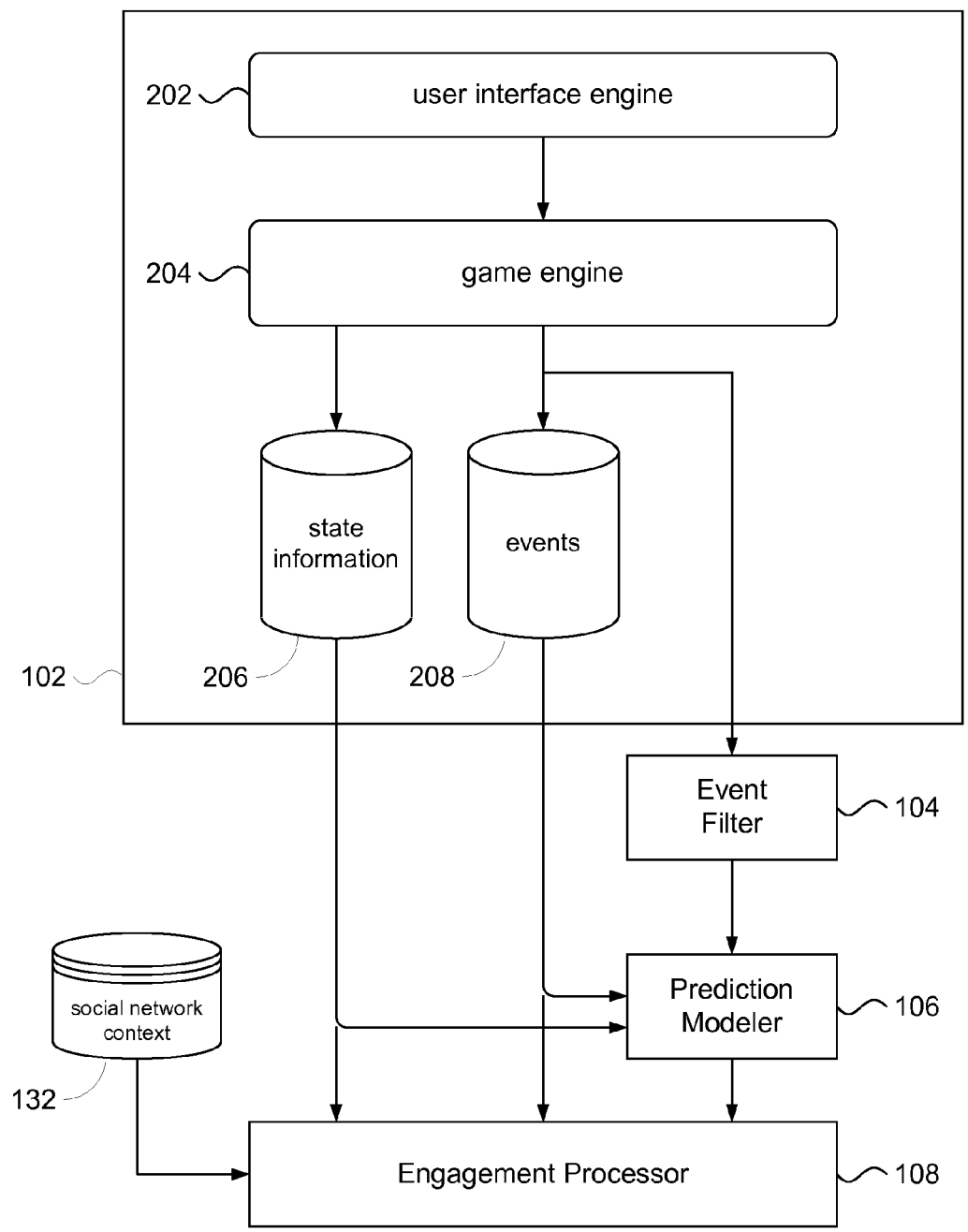
FIG. 2 shows details of the game server shown in FIG. 1.

FIG. 2 shows some additional details of the game server 102 in accordance with the present disclosure. The game server 102 may include a user interface engine 202, a game engine 204, a state information data store 206, and a game events data store 208. The user interface engine 202 may provide graphics rendering capability to produce video and other display information for game play. Input processing from various input devices (e.g., mouse device, keyboard, and so on) may be processed through the user interface engine 202. Access to the gaming system 100 may be provided over the Internet (e.g., via a web browser) or a game application (e.g., executing on a computing device such as a laptop computer, a smartphone, a computer tablet, and so on). For example, the user interface engine 202 may provide a Web services interface for access over the Web. In some embodiments, the user interface engine 202 may interface with a player's game console over the Internet.

The game engine 204 may provide rules processing, event generation and processing, game mechanics, a game environment, and other game infrastructure to manage game play. Players and the game environment (e.g., non-player game elements, and the like) have states (e.g., player is alive and has 1000 experience points, a structure has be destroyed, etc.) that change during game play. The game engine 204 may manage these state changes (collectively referred to as "game state") according to game rules which govern game play. The state information data store 206 may store and manage the game state, including current game state information of the players (e.g., health levels, experience levels, location, possessions, achievements, etc.) and current game state information of the game environment (e.g., number of players in the game, health levels of game elements such as structures and creatures, time of day in the game, etc.).

The game engine 204 may identify the occurrence of game events during game play. In some embodiments, game events may be defined by the game rules. When a game event is deemed to have occurred, the game engine 204 may issue an event (e.g., an event message) to other elements of the game engine. In some embodiments, the game engine 204 may store generated game events in the event data store 208. The game engine 204 may include a time base to synchronize the game state and the game events. Game play may be recorded by storing all the game state changes and game events in the data stores 208, 206.

The game engine 204 may provide the game events to the event filter 104 in addition to being stored in the events data store 208. Game state information and game events may be accessed by the predication modeler 106 via the state information data store 206 and the events data store 208, respectively. The prediction modeler 106 may use game state information and game events to predict the behaviour of a player (e.g., player 122) identified in the event filter 104. By using the current game state of the game environment and the players in the game, the prediction modeler 106 can make a prediction of the what the player is likely to do.

Likewise, the engagement processor 108 may access the state information data store 206 and the events data store 208 to inform the process of generating one or more engagement actions for engaging with the player. The engagement processor 108 may access the social network context 132 to further inform the process of generating suitable engagement actions. By using the current game state and current state of the player, the engagement processor 108 may generate engagement activity that is highly relevant to the player's current situation in the game, thus encouraging engagement by the player who may benefit from the engagement.

Figure 3:
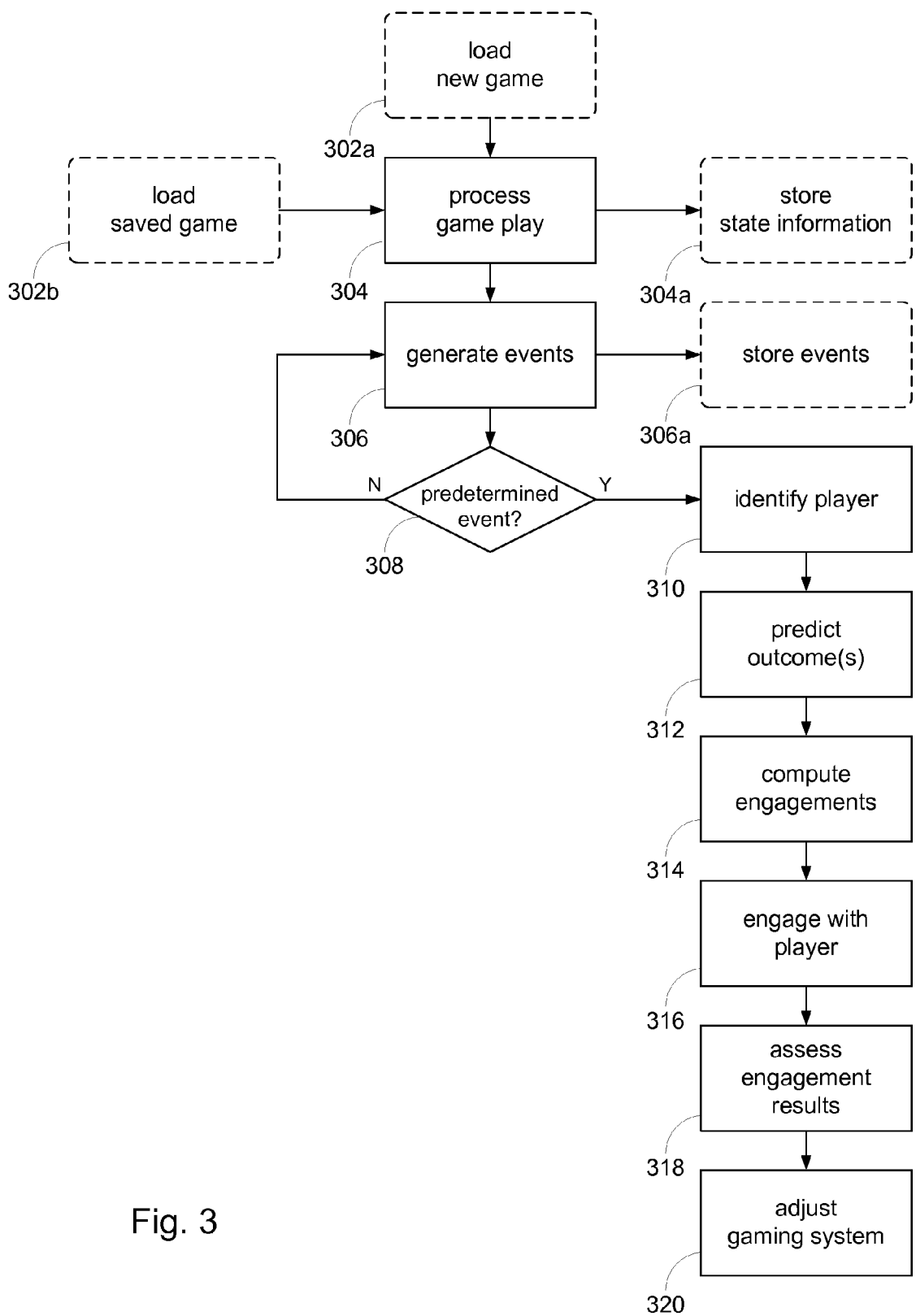
FIG. 3 depicts a workflow within the gaming system according to the present disclosure.

Referring to FIG. 3, a workflow in the gaming system 100 in accordance with the present disclosure includes loading a game. The gaming system 100 may load new game 302a, or the gaming system may load a previously saved game at 302b. At 304, the gaming system 100 may process game play. In the case of a newly initialized game (at 302a), the gaming system 100 may manage game play as players interact with each other in the game environment or with elements in the game environment from the game's initial game state.

If a previously saved game was loaded (at 302b), the gaming system 100 may continue with game play from the game state at the save point. Changes in the state of the players and in the game environment as game play progresses, whether in a new game or from a saved game, may be stored (at 304a) in the state information data store 206. On the other hand, if the previously saved game that was loaded at 302b is simply being replayed, as one would replay a previously recorded video recording, then the processing of game play at 304 will not include storing state information (304a) since no changes of state will occur by simply replaying the previously saved game.

At 306, the game engine 204 may generate game events as game play progresses, whether in a new game or from a previously saved game. Any occurrence in the game environment or with the players during game play may be treated as a game event. In some embodiments, the occurrence of a series of game events may be treated as a game event. At 306a, game events generated during game play may be stored in the event data store 208. On the other hand if a previously saved game is simply being replayed, then processing at 306a is not needed since game events generated at 306 are simply the result of replaying a previously recorded game.

In some embodiments, processing from 308 and following may proceed irrespective of whether the game is being played out or a previously saved game is being replayed. Game events are presented to the event filter 104. The event filter 104 monitors game events and looks for predetermined game events at 308. In accordance with the present disclosure, the event filter 104 serves to identify a player at 310 based on certain game events. The player becomes the target of an engagement, for example, to encourage the player to increase their participation in the game. The event filter 104 may be triggered based on situational game events. For example, when a new player first logs onto the game, the event filter 104 may identify that player as a target for engagement. If the player levels up, or if the player has died for the fifth time, and so on, the event filter 104 may be triggered to identify the player associated with the event as a target for engagement. The event filter 104 may be triggered based on temporal game events; e.g., the player has played for six straight hours, or it has been 48 hours since the player registered as a new player, or the player reached a certain level within a certain period of time, and so on. A game event may be triggered if the player has not logged into the game for some period of time.

When the event filter 104 has identified a player at 310, the prediction modeler 106 may be invoked at 312 to make one or more predictions (outcomes) as to what the player may do under the given circumstances. For example, if a player is killed during game play, that game event (death of a player) may be used to identify the player as a subject for the prediction modeler 106.

In some embodiments, the prediction modeler 106 may implement and evaluate any one or more known predictive algorithms, such support vector machines, linear regression models, decision trees, etc., to model the player's behaviour. Inputs (prediction variables) to the prediction modeler 106 depend on the particular algorithms and on the training data used to develop the models. Accordingly, prediction variables may be based on game events that occur during game play, the player's game state, the game state of other players, the state of the game environment, and so on.

In some embodiments, outcomes of interest that may be predicted by the predictive algorithms may include the player quitting the game, the player making an initial payment to continue playing the game, the player purchasing a game item, and so on. A player may be predicted to make payments for multiple categories of virtual items. In other embodiments, outcomes may indicate the player is likely to purchase real-life items (e.g., a T-shirt, instruction booklets), and so on. In some embodiments, the predictive algorithms may adapt over time in order to change the nature of the outcomes that are predicted. For example, a predicted outcome for a new player may be a decision to register as a paying player, whereas a player who has played for some number of months may be predicted to purchase high-end gaming items in order to advance or otherwise enhance their game play.

The outcome(s) predicted by the prediction modeler 106 may then be processed by the engagement processor 108, at 314, to generate engagement activities, such as presenting one or more recommendations or suggestions, offers to purchase real or virtual items, and so on with which to engage the player. For example, suppose the player was identified by the death of the player, the engagement activity may be a recommendation to the player to take some action to avoid dying on the next go around. The engagement may be to offer the player to buy a virtual item; e.g., a weapon, or a potion, etc. In general, the engagement processor 108 may generate some form of engagement activity to engage the player identified at 310 and modeled at 312 to encourage continued interest in the game, to further their progress in the game, and so on.

In some embodiments, the engagement processor 108 may comprise a hybrid recommender system. Hybrid recommender systems are known and may comprise a combination of two or more single recommender systems. The engagement processor 108 may include expert rule processing to process the game context to further inform the process of generating the engagement activity. As a simple example, suppose the predicted outcome indicates that the player is likely to purchase items from the game. If the current game environment is that the player is in a burning building and the player is very low on health, then the engagement processor 108 may generate an engagement action comprising an offer to sell a "transport spell" to the player so that the player can teletransport out of the burning building.

In some embodiments, the engagement processor 108 may incorporate information from a social network context 132 to further inform the process of generating a suitable engagement activity. For example, the social network context 132 may comprise of a list of players who are teamed up with the identified player in a cooperative game, or a list of players with whom the identified player communicates in the game. The game mechanics may provide a formal social networking infrastructure within the game environment. The engagement processor 108 may generate engagement activity based on actions of the other players in the identified player's social network. For example, if other players in the identified player's social network encountered the same situation confronting the identified player, the engagement action may be a hint as to what those players did to resolve the situation.

It can be appreciated from the foregoing examples that the engagement activity may be any kind of engagement with the player, and is not limited to selling items to the player. The engagement activity may include providing tips for game play, introducing the player to other players, and so on to help the player succeed in the game and thus continue playing the game. The engagement activity may serve to reduce the likelihood of churn; i.e., the player leaving the game. For example, the player may leave the game if they become bored or frustrated. Accordingly, the engagement activity may present new challenges to the player, or may include tips and tricks to overcome an obstacle that may be the source of frustration. And so on.

The engagement activity generated in 314 may then be put into action at 316. For example, if the player has been killed, the gaming system 100 may respawn the player and engage the player by providing hints, offering weapons, and so on before the player re-enters the game. The engagement may simply pop up on the player's interface; e.g., in a pop up window. For example, if the player has been stuck in a situation for some period of time (e.g., appears to be lost in building), an engagement action may include popping up a window and offering a suggestion on what to do. The player may be engaged in an off-line manner. For example, an email may be sent to the player, a text message may sent to the player, and so on. In some embodiments, for example, the engagement may include an interactive avatar such as disclosed in concurrently filed U.S. application Ser. No. 13/659, 517.

The assessor 108 may assess the effectiveness of the engagements, at 318. For example, the assessor 108 may track the success rate of engagement actions that are offers to sell a particular gaming item. The tracking information may include the circumstances under which the offer was made, the players' game states, the pricing structure, and so on. The assessor may track different kinds of advice that were given to players and what happened with those players (did they leave, did they buy things, etc.). The assessments may be displayed on a display device, or a report may be generated, and so on.

At 320, the system administrator 112 may make adjustments to the gaming system 100. In some embodiments, the system administrator's adjustments may be based on the assessments made by the assessor 108 at 318. Generally, any aspect of the gaming system 100 may be adjusted. For example, the game server 102 may be adjusted to change the difficulty level of some game elements, the pricing and price structure of virtual items may be changed. The event filter 104 may be adjusted to identify new types of players for targeting engagements. New prediction algorithms may be added to the prediction modeler 106, or existing algorithms may be tuned in order to improve prediction accuracy. The engagement processor 108 may be adjusted to refine the engagement activity, for example, to apply certain engagements for certain groups of players, alter the way the different players are engaged such as whether to engage during game play or offline, etc. The adjustments serve as feedback into the gaming system 100, thus tuning the gaming system to provide the best gaming experience for players while at the same providing opportunities to improve the revenue stream from the gaming system.

FIG. 4 illustrates a high level block diagram of a computer system 402 configured and programmed to operate as gaming system 100 in accordance with the present disclosure. The computer system 402 may include a central processing unit (CPU) 412 or other similar data processing component. The CPU 412 may be a single processor or a multiprocessor subsystem. The computer system 402 may include various memory components. For example, the memory components may include a volatile memory 414 (e.g., random access memory, RAM) and a data storage device 416. A communication interface 418 may be provided to allow the computer system 402 to communicate over a communication network 422, such as a local area network (LAN), the Internet, and so on, allowing players to access the computer system 402 over the Internet. The communication interface 418 may provide Web services via a suitable Web services interface. An internal bus 420 may interconnect the components comprising the computer system 402.

The data storage device 416 may comprise a non-transitory computer readable medium having stored thereon computer executable program code 432. The computer executable program code 432 may be executed by the CPU 412 to cause the CPU to perform steps of the present disclosure, for example the processing set forth in FIG. 3. The data storage device 416 may store various data structures 434 including, for example, game state information and game events. The data storage device 416 may represent either or both the state information data store 206 and the events data store 208.

The system administrator 112 may interact with the computer system 402 using suitable user interface devices 442, including for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a gaming system comprising operating a computer system in the gaming system to perform steps of:
   detecting events that occur in a game played on the gaming system, the events arising from actions of individual players, actions among players, actions between players and a game environment of the game, and changes in the game environment;
   identifying a predetermined event from the events detected during game play, and in response thereto:
     identifying a player;
     evaluating one or more predictive models using the identified player to, predict a first outcome and a second outcome for the identified player, wherein inputs to the one or more predictive models are based at least on the events detected during game play;
     in response to prediction of the first outcome, identifying a first engagement action based on the first outcome, and communicating with the identified player to engage the identified player in accordance with the first engagement action; and
     in response to prediction of the second outcome, identifying a second engagement action based on the first outcome, and communicating with the identified player to engage the identified player in accordance with the second engagement action.

2. The method of claim 1 wherein inputs to the one or more predictive models are further based on the game context.

3. The method of claim 1 wherein the player is identified when a predetermined event has been detected that involves the player.

4. The method of claim 3 wherein the predetermined event is one among a plurality of predetermined events.

5. The method of claim 1 wherein the game context of the player comprises current game state information of the player and current game state information of the game environment.

6. The method of claim 1 wherein some events are detected based on passage of time.

7. The method of claim 1 wherein some events are detected based on locations in the game environment.

8. The method of claim 1 wherein the game is a previously played game.

9. A gaming system comprising:
   a computer system; and
   a data storage device having stored thereon computer executable program code, which, when executed by the computer system, causes the computer system to:
     detect events that occur in a game played on the gaming system, the events arising from actions of individual players, actions among players, actions between players and a game environment of the game, and changes in the game environment;
     identify a predetermined event from the events detected during game play, and in response thereto:
       identify a player;
       evaluate one or more predictive models using the identified player, to predict a first outcome and a second outcome for the identified player, wherein inputs to the one or more predictive models are based at least on the events detected during game play;
       in response to prediction of the first outcome, identify a first engagement action based on the first outcome, and communicate with the identified player to engage the identified player in accordance with the first engagement action; and
       in response to prediction of the second outcome, identify a second engagement action based on the first outcome, and communicate with the identified player to engage the identified player in accordance with the second engagement action.

10. The gaming system of claim 9 wherein inputs to the one or more predictive models are further based on the game context.

11. The gaming system of claim 9 wherein the player is identified when a predetermined event has been detected that involves the player.

12. The gaming system of claim 9 wherein the game context of the player comprises current game state information of the player and current game state information of the game environment.

13. The gaming system of claim 9 wherein some events are detected based on passage of time and some events are detected based on locations in the game environment.

14. The gaming system of claim 9 wherein the game is a previously played game.

15. A non-transitory computer-readable storage medium having stored thereon computer executable program code, which can be executed by a computer device to perform steps of:
  detecting events that occur in a game played on the gaming system, the events arising from actions of individual players, actions among players, actions between players and a game environment of the game, and changes in the game environment;
  identifying a predetermined event from the events detected during game play, and in response thereto:
   identifying a player;
   evaluating one or more predictive models using the identified player to, predict a first outcome and a second outcome for the identified player, wherein inputs to the one or more predictive models are based at least on the events detected during game play;
  in response to prediction of the first outcome, identifying a first engagement action based on the first outcome, and communicating with the identified player to engage the identified player in accordance with the first engagement action;
  in response to prediction of the second outcome, identifying a second engagement action based on the first outcome, and communicating with the identified player to engage the identified player in accordance with the second engagement action.

16. The non-transitory computer-readable storage medium of claim 15 wherein inputs to the one or more predictive models are further based on the game context.

17. The non-transitory computer-readable storage medium of claim 15 wherein the player is identified when a predetermined event has been detected that involves the player.

18. The method of claim 1 wherein the game context of the player comprises current game state information of the player and current game state information of the game environment.

19. The method of claim 1 wherein some events are detected based on passage of time and some events are detected based on locations in the game environment.

20. The method of claim 1 wherein the game is a previously played game.

\* \* \* \* \*